(12) United States Patent
Walker (10) Patent No.: US 7,996,623 B2
(45) Date of Patent: Aug. 9, 2011

(54) READ AHEAD STORAGE CONTROL

(75) Inventor: Michael D. Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 51 days.

(21) Appl. No.: 11/480,086

(22) Filed: Jun. 30, 2006

(65) Prior Publication Data
US 2008/0005481 A1    Jan. 3, 2008

(51) Int. Cl.
*G06F 13/14* (2006.01)
(52) U.S. Cl. ............ 711/137; 711/167; 711/169; 710/5; 710/6
(58) Field of Classification Search .................. 711/118, 711/137, 167, 169; 712/205, 207; 710/5, 710/6
See application file for complete search history.

(56) References Cited

U.S. PATENT DOCUMENTS

| | | | |
|---|---|---|---|
| 5,410,653 A * | 4/1995 | Macon et al. ................. | 711/137 |
| 5,594,885 A | 1/1997 | Lautzenheiser ............... | 711/133 |
| 5,623,608 A | 4/1997 | Ng ................................ | 711/137 |
| 6,098,185 A * | 8/2000 | Wilson ......................... | 714/710 |
| 6,212,603 B1 * | 4/2001 | McInerney et al. ........... | 711/125 |
| 6,233,641 B1 * | 5/2001 | Graham et al. ................ | 710/316 |
| 6,233,645 B1 * | 5/2001 | Chrysos et al. ............... | 710/244 |
| 6,260,115 B1 * | 7/2001 | Permut et al. ................. | 711/134 |
| 6,453,388 B1 * | 9/2002 | Gonzales et al. ............. | 711/137 |
| 6,557,079 B1 | 4/2003 | Mason, Jr. et al. ............ | 711/137 |
| 6,633,891 B1 | 10/2003 | Bamford et al. .............. | 707/203 |
| 6,862,657 B1 * | 3/2005 | Grimsrud et al. ............. | 711/112 |
| 6,934,802 B2 | 8/2005 | Cornaby et al. .............. | 711/113 |
| 6,938,125 B2 | 8/2005 | Yamamoto et al. ........... | 711/114 |
| 7,028,297 B2 | 4/2006 | Horn et al. ................... | 718/100 |
| 7,743,216 B2 * | 6/2010 | Lubbers et al. ............... | 711/137 |
| 7,809,883 B1 * | 10/2010 | Fair et al. ..................... | 711/113 |
| 7,822,731 B1 * | 10/2010 | Yu et al. ....................... | 707/705 |
| 2005/0154825 A1 * | 7/2005 | Fair .............................. | 711/113 |
| 2006/0026364 A1 | 2/2006 | Haswell ........................ | 711/137 |
| 2009/0006813 A1 * | 1/2009 | Singhal et al. ................ | 712/207 |

* cited by examiner

*Primary Examiner* — Sanjiv Shah
*Assistant Examiner* — Sam Dillon
(74) *Attorney, Agent, or Firm* — Fellers, Snider, et al.

(57) ABSTRACT

Method and apparatus for managing the storage of data in a cache memory by placing pending read requests for sequential data in a dedicated read ahead stream control (RASC) data structure, and further configured for dynamically switching both ways, in response to data stored in the RASC, between speculative non-requested read ahead data streaming to read behind stream locking on the read requests in the RASC.

11 Claims, 5 Drawing Sheets

READ AHEAD STORAGE CONTROL

FIELD OF THE INVENTION

The claimed invention relates generally to the field of data storage systems and more particularly, but not by way of limitation, to a method and apparatus for dynamically and continuously streaming data to a cache memory by transferring both speculative non-requested read ahead data and read behind stream locking of requested data.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for continuously streaming data to a cache memory by dynamically switching both ways between speculative fetching of non-requested read ahead data and read behind stream locking of pending I/O commands.

In some embodiments a cache manager is provided that is configured for placing pending read requests for sequential data in a dedicated read ahead stream control (RASC) data structure, and further configured for storing sequential data in a cache by switching, in response to data stored in the RASC, from speculative non-requested read ahead data to read behind stream locking on the read requests in the RASC.

In some embodiments a data storage system is provided with a cache memory and means for satisfying access requests for sequential data by continuously streaming both requested data and non-requested data from a storage array to the cache memory.

In some embodiments a method is provided including providing a data storage system having the RASC, placing pending read requests for sequential data in the RASC, and dynamically switching, in response to data stored in the RASC, from caching speculative non-requested read ahead data to read behind stream locking of read requests in the RASC.

DETAILED DESCRIPTION

Figure 1:
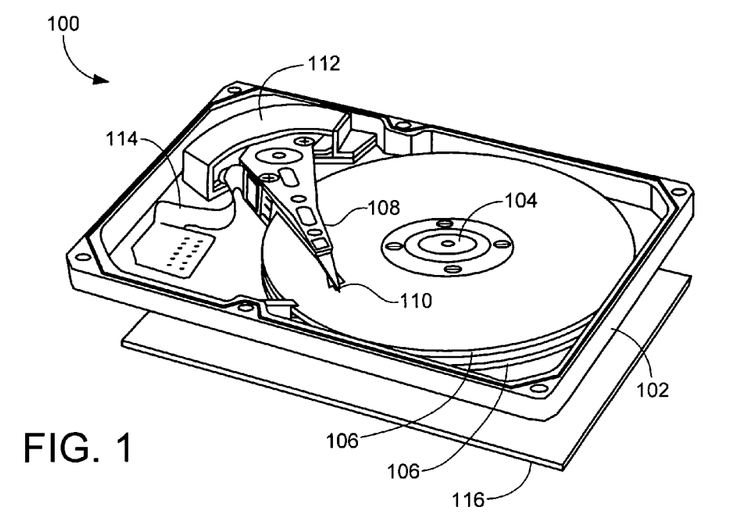
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
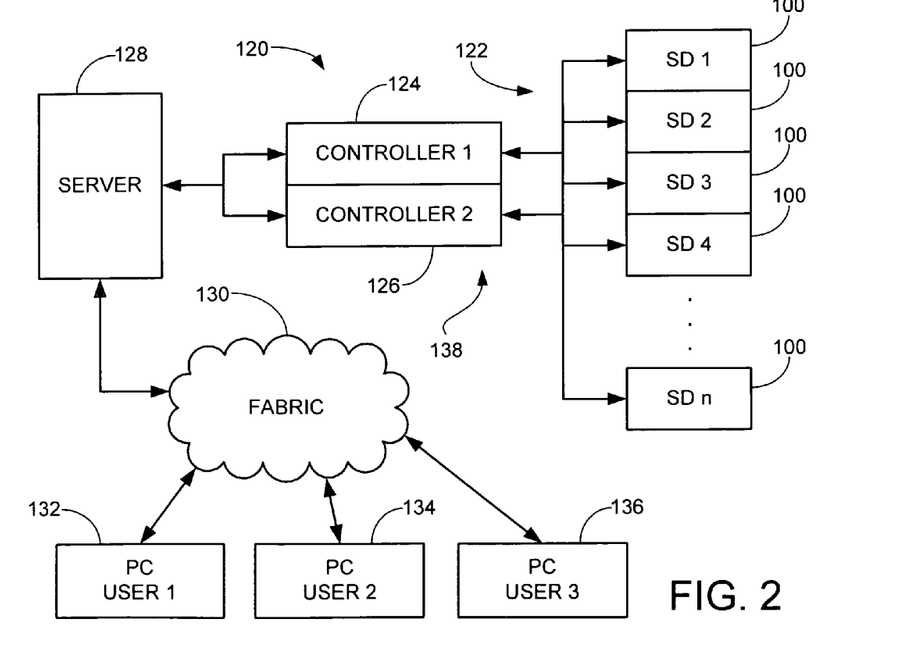
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage array 122. Redundant controllers 124, 126 preferably operate to transfer data between the storage array 122 and a server 128 (host). The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA) 138. The MDA 138 preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
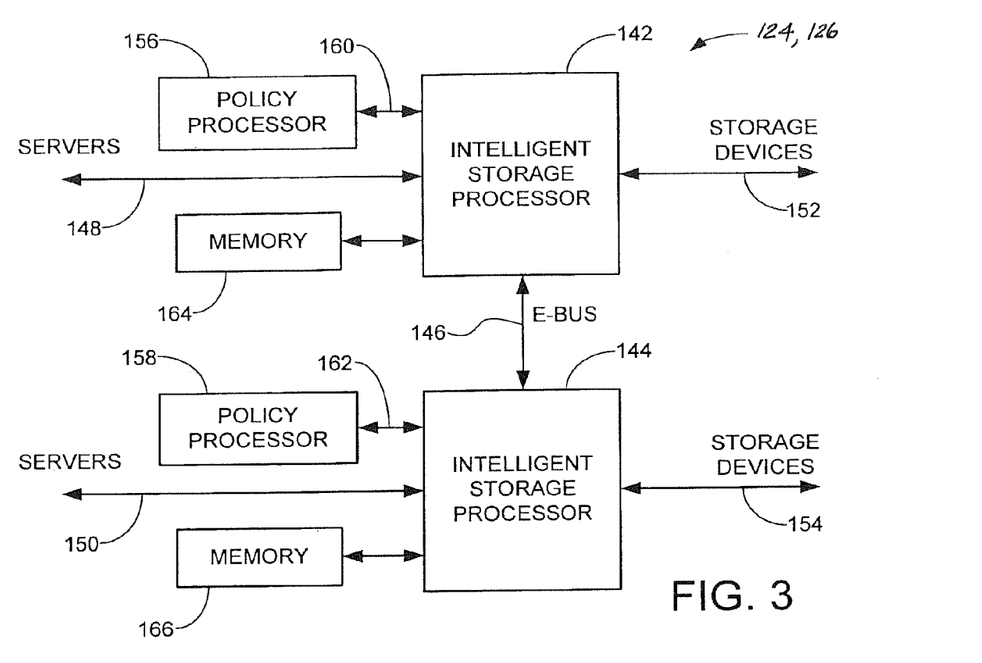
FIG. 3 provides a general representation of a preferred architecture of the controllers of FIG. 2.

FIG. 3 shows an array controller 124, 126 configuration that is useful in the network of FIG. 2. Two intelligent storage processors (ISPs) 142, 144 are coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (RTOS) for the controller 124, 126 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
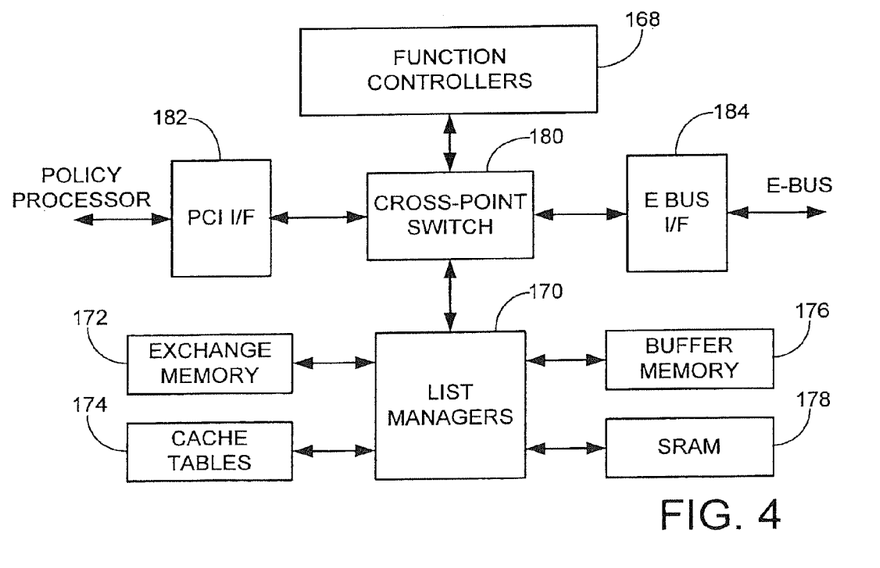
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170, are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a crosspoint switch (CPS) module 180. In this way, a selected FCC 168 can establish a communication pathway through the CPS 180 to a corresponding list manager 170 to communicate a status, access a memory module, or invoke a desired ISP operation.

Similarly, a selected list manager 170 can communicate responses back to the FCCs 168 via the CPS 180. Although not shown, separate data bus connections are preferably established between respective elements of FIG. 4 to accommodate data transfers therebetween. As will be appreciated, other configurations can readily be utilized as desired.

A PCI interface (I/F) module 182 establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

When data requests are issued by a host device the controller 124, 126 directs the movement of the requested readback data from the storage devices 100 to cache memory in preparation for subsequent transfer to the host device. To further enhance processing efficiency, the controller architecture preferably employs a novel speculative data caching methodology.

Speculative data are non-requested data that are moved to the cache memory in hopes of satisfying a subsequent request for that data by a host device. Generally, preferred embodiments of the present invention are directed to adaptively making decisions with regard to when to perform a speculative read, as well as to managing the retention of such speculative data in cache.

Figure 5:
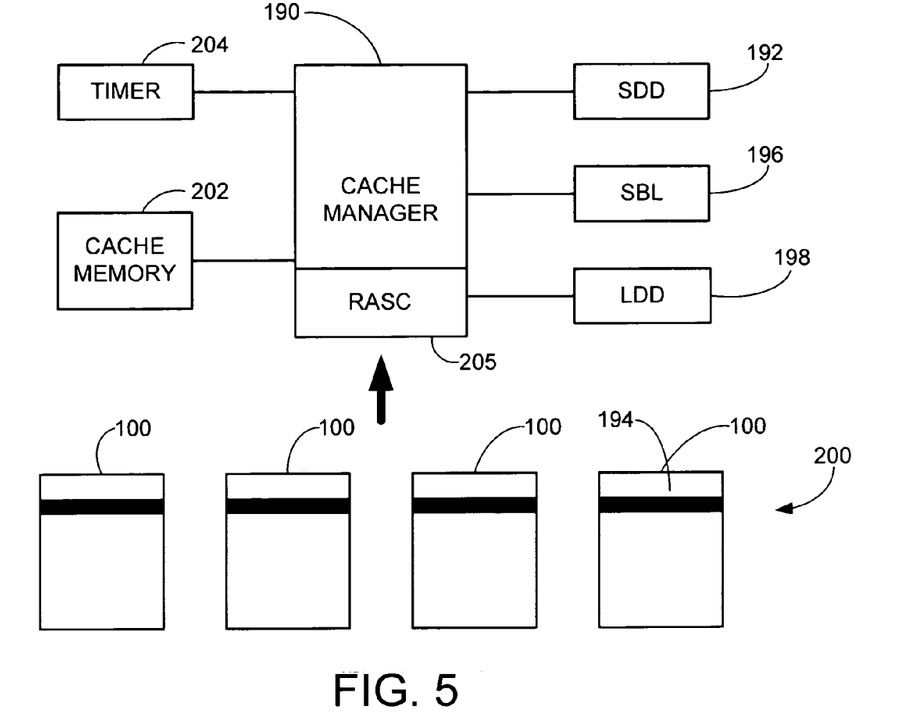
FIG. 5 generally illustrates a cache manager which operates to manage readback data retrieved from the storage array in accordance with preferred embodiments.

As shown in FIG. 5, cached data are preferably managed on a node basis by a cache manager (CM) 190 using a data structure referred to as a stripe data descriptor (SDD) 192. Each SDD holds data concerning recent and current accesses to the data with which it is associated. Each SDD thus preferably corresponds to and aligns with a data structure as a subset of the overall storage array, such as a corresponding RAID stripe 194 (i.e., all of the data on a plurality of devices 100 associated with a particular parity set). Each SDD 192 further preferably conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list. The logical discs are preferably managed using an associated logical disc descriptor (LDD) 198.

Each SDD 192 preferably includes variables (parameters) that indicate various states of the data. SDD variables that are preferably utilized in accordance with preferred embodiments can include, without limitation, access history, last offset, last block, timestamp data (time of day, TOD), RAID level employed, stream count, stream size, and speculative data status.

The access history of the SDD 192 preferably provides a relative measure of a rate at which accesses are made to the data associated with the SDD. For example, an accesses variable can be an incremental count that is updated upon each access to the data defined by the SDD. The accesses variable thus provides an indication of "host interest" in the data in this locality; under normal circumstances, a higher existing number of accesses might produce a higher likelihood that more accesses will occur in the near future.

The TOD variable generally provides an indication of elapsed time since the most recent access. By subtracting the TOD variable from the current time, an aging assessment can be made on how frequently (or infrequently) the SDD is being accessed.

The stream count generally provides an incremental count of successively issued requests for data from the storage array that falls into a concurrent sequence (a "stream"). Stream size provides an overall indication of the then existing size of the stream (such as in terms of overall numbers of sectors, etc.). When a request just follows a previous request as determined by the VBA matching the previous last VBA based on the last offset and last block values, the stream count is incremented and the stream size is adjusted to match the new overall range. The speculative data status value generally identifies the associated data ranges of speculatively retrieved data within the stream.

The LDD 198 preferably provides data on a logical disc basis, which can span several SDDs. The LDD 198 includes a number of variables utilized in the various preferred embodiments discussed herein including an LDD stream count and LDD stream size.

Preferably, during normal operations the CM 190 operates to direct the retrieval of requested data from the storage array to cache memory, such as represented by block 202 in FIG. 5. The CM 190 will also operate from time to time to additionally retrieve speculative non-requested data along with the retrieval of the requested data. A timer 204 preferably characterized as a free running counter provides timing information to assess aging of the cached requested and speculative data.

Figure 6:
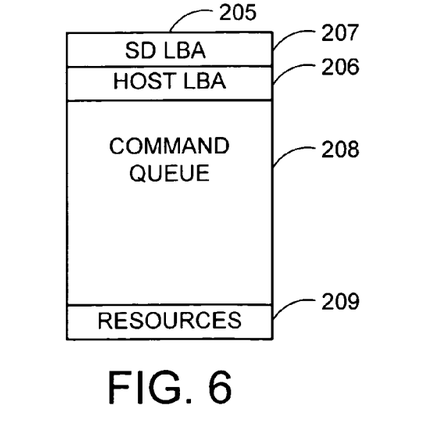
FIG. 6 diagrammatically depicts a read ahead storage control (RASC) constructed in accordance with embodiments of the present invention.

The CM 190 employs a read ahead stream control (RASC) 205 data structure and written instructions stored in memory that are executable to utilize the RASC 205 to dynamically switch from speculative read ahead caching of non-requested data (or "caching speculative data") to read behind stream locking on the host requests for sequential data (or "caching demand data"). FIG. 6 diagrammatically depicts the RASC 205 which allocates memory for storing the logical block address (LBA) of a particular host access command 206 and the contemporaneous LBA of the storage device 207. Preferably, the CM 190 switches from caching non-requested read ahead data to read behind stream locking of requested data when the host read request LBA 206 is greater than the speculative non-requested read ahead data LBA 207. Other spatial relationships can be employed in equivalent alternative embodiments, such as but not limited to a gap existing between the host LBA 206 and the storage device logical block address (SD LBA) 207.

The CM 190 places the detected pending requests for sequential data in a dedicated command queue 208 which provides a separate read stream structure where the data requests are queued sequentially. A corresponding set of dedicated controller resources 209 continuously stream data to the cache 202 by dynamically switching from speculative fetching of non-requested read ahead data to read behind stream locking on the sequential data requests in the command queue 208 when the host requests overrun the speculative fetching capability of the device 100. As data is retrieved from the storage device 100 that satisfies a pending data request, that data request is de-queued and acknowledged to the host. The dedicated set of controller resources 209 for dynamically switching sequential streaming of data between reading ahead and reading behind prevents the totality of I/O streams from overwhelming the controller 124, 126 that would otherwise cause other I/O streams to degrade in performance. It also provides for continuously streaming of data to the cache 202 when ceasing speculative fetching of non-requested data, by presenting the pending data requests sequentially as opposed to becoming multiple parallel read requests.

Figure 7:
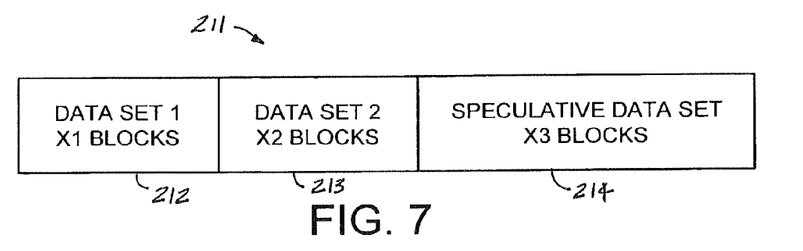
FIG. 7 shows an exemplary stream of data retrieved by the cache manager from the storage array to the cache memory.

In a preferred embodiment, an operation to retrieve speculative data commences upon detection of a stream; that is, detection of a number of successive requests for consecutively placed read data. An exemplary stream 211 ("STREAM A") is represented in FIG. 7. The stream 211 is stored in the cache memory 202 and constitutes a number of consecutive, concurrently addressed blocks (sectors).

In the present example, the CM 190 receives and satisfies a first request to retrieve a first set of data 212 (DATA SET 1), with a corresponding number of blocks X1. At some point during this processing the CM receives and satisfies a second request to retrieve a second set of data 213 (DATA SET 2), with blocks X2. Note that X2 may or may not be the same number of blocks as X1, but the blocks X1 and X2 preferably define an overall sequential range of block addresses of a selected SDD data structure.

Upon receipt of the second read request, the CM 190 elects to proceed with the retrieval of speculative, non-requested data as represented by block 214. The block 214 represents speculative data, in this case X3 blocks corresponding to the rest of the SDD data structure (e.g., the rest of the associated stripe 194 in FIG. 5 from the associated device 100). In other equivalent embodiments, however, the speculative data set 214 can be fetched for an indefinite block of data, but which is terminated only by the RASC 205. In other words, in the latter embodiments the fetching of an indefinite block of data means that at the time the fetching of the speculative set 214 begins, that speculative fetching is defined as being for a block of data the size of which at that time is not determined, or indeterminate.

The decision by the CM 190 to proceed with pulling speculative data is preferably carried out through reference to both time and locality parameters: that is, the SDD stream count indicates a count of 2, the SDD stream size indicates a large enough sequence of data has been requested to indicate a stream, and the TOD value indicates that the requests are currently ongoing (i.e., "now").

Under such circumstances, the CM 190 preferably determines that there is a likelihood of future requests for sequential data, and it is sufficiently efficient from a seek latency standpoint to proceed with switching to speculative read ahead caching of non-requested data.

Again, it will be noted that it is not necessarily required that the CM 190 operate to speculatively retrieve a finite block of data. That is, in some embodiments the speculative fetching of data can be initiated indefinitely, until switched by the CM 190 in response to information from the RASC 205. In alternative embodiments, intermediate groups of data associated with less than one data structure or a predetermined number of data structures can be speculatively read upon detection of a stream.

Figure 8:
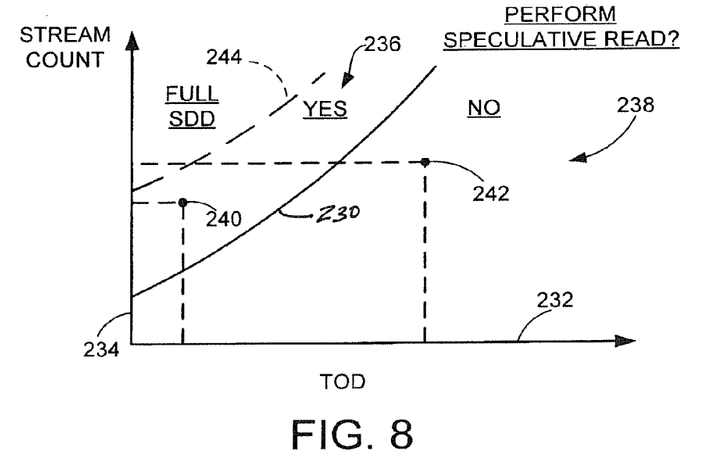
FIG. 8 graphically illustrates a boundary curve to set forth a preferred operation of the cache manager in making decisions with regard to caching speculative non-requested data.

FIG. 8 provides a graphical representation of a boundary curve 230 plotted against a TOD x-axis 232 and a stream count y-axis 234. The curve 230 generally forms separate decision regions 236, 238 respectively above and below the curve 230. The curve 230 is generally indicative of the operation of the CM 190, and can thus take any suitable shape and can further be adaptively adjusted in response to observed performance.

Generally, the decision as to whether speculative data should be pulled is preferably made in relation to where a given operational point falls in the graph. Operational point 240 corresponds to a given stream count and TOD indication that collectively indicate that it would be advantageous to proceed with a speculative data pull, as point 240 falls within "yes" region 236. By contrast, operational point 242 provides stream count and TOD values that indicate that it would be better not to proceed with a speculative data pull at this time, since point 242 falls within "no" region 238.

It can be seen that a speculative data pull can be triggered in response to a relatively small stream count, so long as the read commands are issued over a correspondingly short period of time. At the same time, a larger stream count will generally be required to trigger a speculative data pull if the commands are more widely spaced apart. The boundary curve 230 thus operates as respective thresholds for the time and locality parameters, both of which need be met prior to a speculative data pull.

As desired, additional boundary curves can be provided to the yes region 236 to provide gradients in the amount of speculative data that should be pulled. For example, operational points above curve 244 can trigger the speculative read of an entire SDD data structure.

Figure 9:
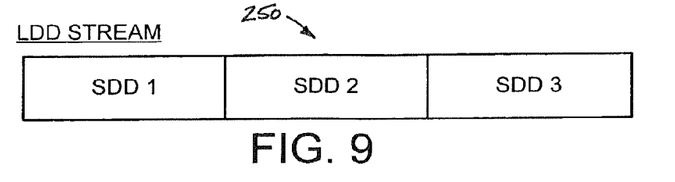
FIG. 9 shows a sequence of different streams concurrently maintained by the cache manager.

Preferably, each SDD 192 provides individual stream count, size and TOD values relating to the associated SDD data structure. The LDD 198 further preferably tracks streams that extend across multiple adjacent SDDs within the logical disk, such as shown by LDD stream 250 in FIG. 9. It will be appreciated that the LDD stream 250 can comprise groups of both requested and speculative non-requested data that consecutively span the overall range of the stream.

Once speculative data have been moved into the cache memory 202, the CM 190 preferably employs additional processes to manage the retention of such data. As will be appreciated, cache memory is a valuable and limited resource. Once a selected set of memory cells in the cache memory 202 have been allocated to store a particular set of data, those memory cells are unavailable to store other data until the memory cells are deallocated. An efficient cache management methodology thus stores and retains only data that has value in terms of satisfying future cache hits, and to discard the rest.

Figure 10:
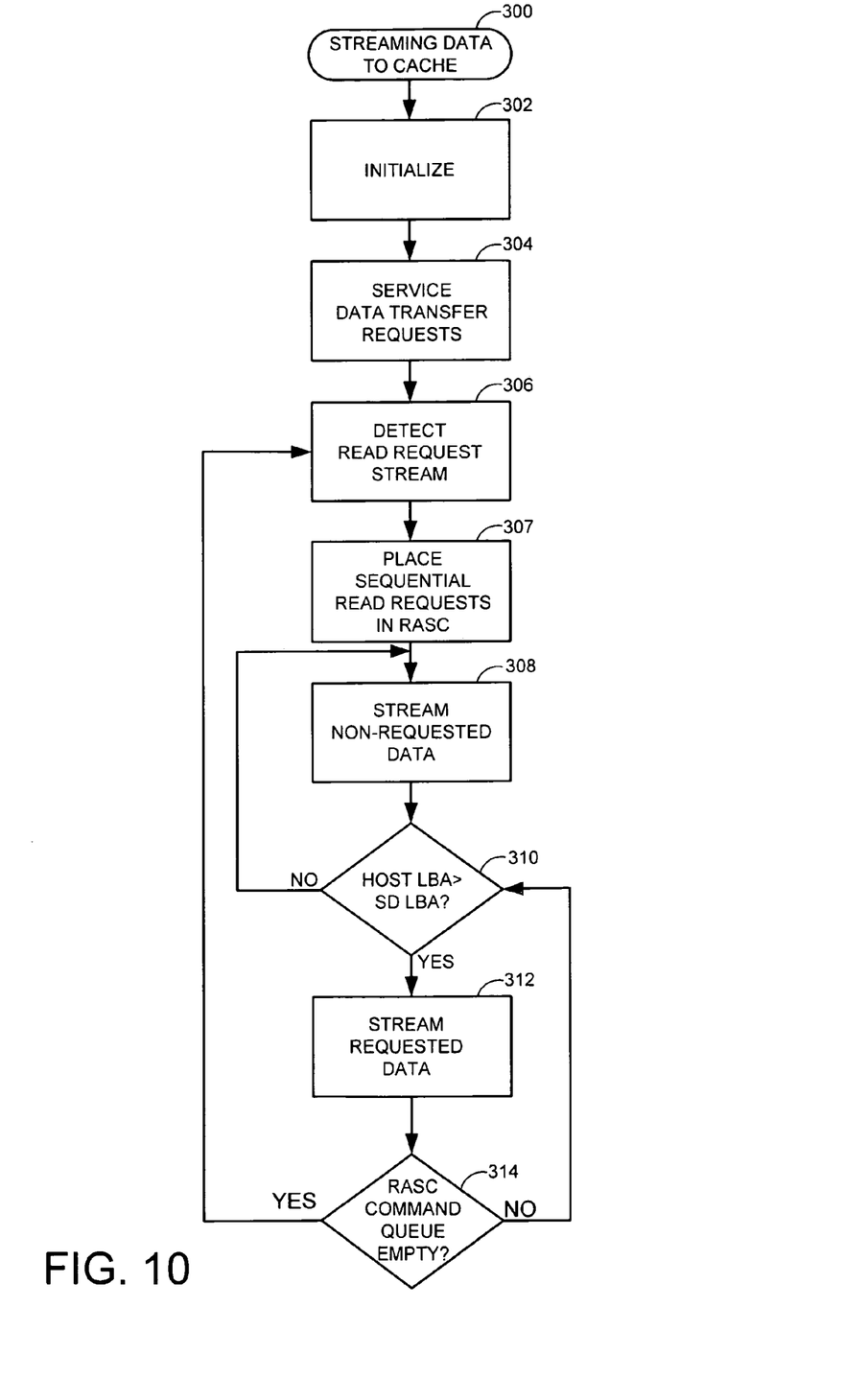
FIG. 10 is a flow chart for a STREAMING DATA TO CACHE routine generally illustrative of steps carried out in accordance with preferred embodiments of the present invention.

The foregoing operation can be generally illustrated by a STREAMING DATA TO CACHE routine 300 in FIG. 10, which is generally illustrative of steps carried out in accordance with preferred embodiments of the present invention.

At step 302, a system such as the network 120 of FIG. 2 is initialized for operation. The system proceeds to service data transfer requests at step 304 to transfer data between a storage array such as 122 and various host devices.

Such requests will preferably include write data requests wherein data to be written to the array are moved to cache memory such as 202 pending subsequent transfer to the devices 100, as well as read data requests wherein data stored on the devices 100 are moved to the cache memory 202 and then on to the requesting device. Preferably, requests for data are satisfied directly from the cache memory in the form of cache hits, as available.

A cache manager such as 190 preferably operates to detect a stream of data requests at step 306. As discussed above, such streams are preferably detected at a variety of levels, including within a selected data structure (e.g., SDD) or among adjacent consecutive data structures, such as in relation to time and locality parameters of an associated data structure. Once a stream of data requests is detected in block 307, the CM 190 places them in the dedicated command queue 208 of the RASC 205. Also upon detection of a stream, the CM 190 preferably operates at step 308 to initiate retrieval of speculative non-requested data into the cache memory 202.

In block 310 it is determined whether the host accesses have overrun the storage device 100 ability to fetch speculative read ahead data. In some embodiments this is accomplished by comparing the host LBA 206 to the SD LBA 207 in the RASC 205. If the determination of block 310 is no, then control remains with speculative fetching read ahead data in block 308. If, however, the determination of block 310 is yes, then the CM 190 switches to read behind stream locking of the pending data requests in the RASC 205 in block 312. It will be noted that at a time when there remains pending data requests in the RASC 205, if the determination of block 310 changes to "no" then the speculative fetching of read ahead data can be re-initiated in block 308.

The foregoing embodiments provide several advantages over the art. Using both time and locality factors in making speculative cache decisions generally provides a better assessment of overall trends in performance loading, and more efficiently allocates cache resources to the retention of data. The dedicated command queue and controller resources serve to improve overall I/O performance and prevent sequential read requests from fragmenting into multiple parallel read requests, especially by ceasing speculative read ahead fetching of data. The adaptive techniques set forth above further provide a mechanism to continuously fine tune various caching parameters to meet changing needs of the system, particularly in high activity regions.

The term caching and the like will be construed consistent with the foregoing discussion as the operation to determine what data is stored in cache memory. The cache memory can be a single device or incorporated as a memory space across multiple devices.

Although not necessarily required, the caching operation preferably comprises making the decision to allocate memory cells in the cache memory currently storing the readback data so as to prevent overwriting of said cells by other data. A subsequent release of such retained data from the cache preferably comprises deallocation of said cells to permit subsequent overwriting thereof by newly introduced cached data.

For purposes of the appended claims, the recited "means for satisfying access requests" will be understood to correspond to the CM 190 utilization of its RASC 205 data structure which carries out data caching operations in accordance with FIG. 10.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a storage processor executing read commands from a host to retrieve data stored in a storage space; and
    a cache manager that identifies a read stream of two or more of the read commands that are for sequential data, that derives a quantitative value for the identified read stream in terms of stream block count and time, that in addition to streaming requested data from the storage space associated with the identified read stream also streams a speculative stream of an indeterminate number of blocks, indeterminate at the time the speculative stream begins, from the storage space when the quantitative value is greater than a predetermined threshold value until switching from streaming the speculative stream of the indeterminate number of blocks to streaming other requested data associated with subsequent read commands from the host based on a comparison of a storage location of requested data associated with one of the subsequent read commands from the host to a contemporaneous storage location of the speculative stream of the indeterminate number of blocks.

2. The apparatus of claim 1 wherein the comparison indicates that the subsequent one of the read commands from the host has overrun the contemporaneous speculative stream of the indeterminate number of blocks.

3. The apparatus of claim 2 wherein the comparison is that of a logical block address (LBA) associated with the subsequent one of the read commands from the host to an LBA associated with the contemporaneous speculative stream of the indeterminate number of blocks.

4. The apparatus of claim 3 wherein the cache manager switches from streaming the speculative stream of the indeterminate number of blocks to streaming the requested data for the read commands from the host when the subsequent one of the read commands LBA is greater than the contemporaneous speculative stream LBA of the indeterminate number of blocks.

5. A method comprising:
  receiving read commands for data that are stored in a storage space;
  identifying a read stream of two or more of the read commands that are for sequential data;
  deriving a quantitative value for the identified read stream in terms of stream block count and time;
  comparing the quantitative value to a predetermined threshold value;
  when the comparing values step determines the quantitative value exceeds the predetermined threshold value, streaming a speculative stream of an indeterminate number of blocks, indeterminate at the time the speculative stream begins, from the storage space in addition to streaming the data associated with the identified read stream;
  during the streaming the indeterminate number of blocks step, comparing a location of data associated with a subsequent read command from the host to a contemporaneous storage location of the streaming the speculative stream of the indeterminate number of blocks; and
  when the comparing locations step satisfies a predefined criteria, switching from streaming the speculative stream of the indeterminate number of blocks to streaming data associated with other read commands from the host.

6. The method of claim 5 wherein the switching step occurs when the comparing locations step indicates that the subsequent one of the read commands from the host has overrun the contemporaneous storage location of the streaming the speculative stream of the indeterminate number of blocks.

7. The method of claim 6 wherein the comparing locations step is characterized by comparing a logical block address (LBA) associated with the subsequent one of the read commands from the host to an LBA associated with the contemporaneous storage location of the streaming the speculative stream of the indeterminate number of blocks.

8. The method of claim 7 wherein the switching step occurs when the subsequent one of the read commands from the host LBA is greater than the contemporaneous storage location LBA of the streaming the speculative stream of the indeterminate number of blocks.

9. The method of claim 8 comprising switching again to streaming another speculative stream of an indeterminate number of blocks when another subsequent one of the read commands from the host LBA is less than the contemporaneous storage location LBA of the streaming the speculative stream of the indeterminate number of blocks.

10. The method of claim 5 wherein the switching step occurs when the comparing locations step indicates that the subsequent one of the read commands from the host and the contemporaneous storage location of the streaming the speculative stream of the indeterminate number of blocks define a range that exceeds a predetermined threshold range.

11. The apparatus of claim 3 wherein the cache manager switches from streaming the speculative stream of the indeterminate number of blocks to streaming the requested data for the read commands from the host when the subsequent one of the read commands from the host LBA and the speculative stream LBA of the indeterminate number of blocks define a range that is greater than a predetermined threshold range.

* * * * *